United States Patent
Xu et al.

(10) Patent No.: US 10,237,033 B2
(45) Date of Patent: Mar. 19, 2019

(54) METHOD FOR DETERMINING PILOT SYMBOL POSITION, USER EQUIPMENT AND BASE STATION

(71) Applicant: Beijing Spreadtrum Hi-Tech Communications Technology Co., Ltd., Beijing (CN)

(72) Inventors: Weijie Xu, Shanghai (CN); Xu Zhao, Shanghai (CN)

(73) Assignee: Beijing Spreadtrum Hi-Tech Communications Technology Co., Ltd., Beijing (CN)

( * ) Notice: Subject to any disclaimer, the term of this patent is extended or adjusted under 35 U.S.C. 154(b) by 13 days.

(21) Appl. No.: 15/442,652

(22) Filed: Feb. 25, 2017

(65) Prior Publication Data

US 2018/0048443 A1 Feb. 15, 2018

(30) Foreign Application Priority Data

Aug. 9, 2016 (CN) .......................... 2016 1 0647536

(51) Int. Cl.
*H04W 4/00* (2018.01)
*H04L 5/00* (2006.01)
(Continued)

(52) U.S. Cl.
CPC .......... *H04L 5/0048* (2013.01); *H04L 5/0007* (2013.01); *H04L 5/0023* (2013.01);
(Continued)

(58) Field of Classification Search
None
See application file for complete search history.

(56) References Cited

U.S. PATENT DOCUMENTS

| 9,844,046 B2 | 12/2017 | Wang et al. |
| 2006/0172704 A1* | 8/2006 | Nishio ............... H04L 5/0007 |
| | | 455/67.11 |

(Continued)

FOREIGN PATENT DOCUMENTS

| CN | 105191464 A | 12/2015 |
| CN | 105515743 A | 4/2016 |

(Continued)

OTHER PUBLICATIONS

Office Action dated May 22, 2018 in Chinese Patent Application No. 201610647536.1.

(Continued)

*Primary Examiner* — Anh Vu H Ly
(74) *Attorney, Agent, or Firm* — Vierra Magen Marcus LLP (57) ABSTRACT

A method for determining pilot symbol position, a user equipment and a base station, the method includes: determining a pattern of candidate pilot symbol positions for an uplink sTTI (shortened Transmission Time Interval) transmission in an uplink sub-frame; receiving an uplink grant from a base station, where the uplink grant is used to schedule the uplink sTTI transmission; and determining at least one pilot symbol position for an uplink sTTI based on the pattern of candidate pilot symbol positions and position indication information in the uplink grant. Technical solutions of the present disclosure can reduce bit overhead in a process of determining pilot symbol position.

12 Claims, 5 Drawing Sheets

(51) Int. Cl.
*H04W 72/12* (2009.01)
*H04W 88/02* (2009.01)

(52) U.S. Cl.
CPC .......... *H04L 5/0082* (2013.01); *H04L 5/0094* (2013.01); *H04W 72/1268* (2013.01); *H04W 88/02* (2013.01)

(56) References Cited

U.S. PATENT DOCUMENTS

| | | | | |
|---|---|---|---|---|
| 2010/0002787 | A1* | 1/2010 | Choi | H04L 5/0023 375/260 |
| 2010/0254468 | A1* | 10/2010 | Kim | H04L 5/0007 375/260 |
| 2011/0058505 | A1* | 3/2011 | Pan | H04J 11/005 370/280 |
| 2013/0182618 | A1* | 7/2013 | Chen | H04J 3/1694 370/280 |
| 2016/0065341 | A1 | 3/2016 | Yoo et al. | |
| 2016/0254892 | A1* | 9/2016 | Kim | H04W 52/34 370/280 |
| 2017/0223702 | A1* | 8/2017 | Yin | H04L 1/1812 370/328 |
| 2017/0332397 | A1* | 11/2017 | Li | H04L 1/1861 370/328 |
| 2017/0338988 | A1* | 11/2017 | Yin | H04L 27/2613 370/328 |
| 2017/0366311 | A1* | 12/2017 | Iyer | H04L 5/005 370/328 |
| 2018/0110045 | A1* | 4/2018 | You | H04W 72/042 370/328 |
| 2018/0110062 | A1* | 4/2018 | Byun | H04W 72/1257 370/328 |
| 2018/0115984 | A1* | 4/2018 | Sahlin | H04W 72/1268 370/328 |

FOREIGN PATENT DOCUMENTS

| | | |
|---|---|---|
| WO | 2015148041 A1 | 10/2015 |
| WO | 2015197110 A1 | 12/2015 |

OTHER PUBLICATIONS

Ericsson, Tdoc: "R1-163323: Definition of DI Bit Fields for Short TTI", 3GPP TSG RAN WG1 Meeting #84bis, Feb. 15-19, 2016.
Mitsubishi Electric, Tdoc: "R1-160699: Design of UL Reference Signal for PUSCH With sTTI", 3GPP TSG RAN WG1 Meeting #84, Feb. 5, 2016.

* cited by examiner

METHOD FOR DETERMINING PILOT SYMBOL POSITION, USER EQUIPMENT AND BASE STATION

CROSS-REFERENCE TO RELATED APPLICATIONS

This application claims the benefit of priority to Chinese Patent Application No. 201610647536.1, filed on Aug. 9, 2016, and entitled "METHOD FOR DETERMINING PILOT SYMBOL POSITION, USER EQUIPMENT AND BASE STATION", and the entire disclosure of which is incorporated herein by reference.

TECHNICAL FIELD

The present disclosure generally relates to wireless communication technical field, and more particularly, to a method for determining pilot symbol position, a user equipment and a base station.

BACKGROUND

With development of communication technology, in more and more application scenarios, such as online games, virtual reality, industrial detection and vehicle networking, demanding for time delay is increasing, and the users expect a shorter time delay for end-to-end communication.

At present, the 3GPP (3rd Generation Partnership Project) has begun to study and standardize transmission technology of sTTI (shortened Transmission Time Interval) based on LTE (Long Term Evolution) technology. Objects mainly studied include a sTTI which has a length of 2/4/7 symbols and is supported by FDD (Frequency Division Duplexing), and a sTTI which has a length of 7 symbols and is supported by TDD (Time Division Duplexing).

In existing technologies, in order to maintain an uplink single-carrier property, one column of UL (uplink) pilots of LTE PUSCHs (Physical Uplink Shared Channels) occupies one uplink SC-FDMA (Single-Carrier Frequency Division Multiple Access) symbol. The base station transmits an uplink grant to a UE (User Equipment) via DCI (Downlink Control Information). Through the DCI, the base station indicates to the UE whether there is a pilot symbol in a specific sTTI or not. If there is no pilot symbol in the sTTI, the base station indicates, in the DCI, to the UE a relative distance between a pilot symbol position and the sTTI.

However, in above recited technical solutions, in a process of the UE obtaining the pilot symbol position, the bit overhead of the DCI is large.

SUMMARY

Problem to be solved by the present disclosure includes how to reduce bit overhead of DCI (Downlink Control Information) in a process of determining pilot symbol position.

In order to solve above recited problem, the present disclosure provides a method for determining pilot symbol position, including: determining a pattern of candidate pilot symbol positions for an uplink sTTI (shortened Transmission Time Interval) transmission in an uplink sub-frame; receiving an uplink grant from a base station, where the uplink grant is used to schedule the uplink sTTI transmission; and determining at least one pilot symbol position for an uplink sTTI based on the pattern of candidate pilot symbol positions and position indication information in the uplink grant.

In some embodiments, determining a pattern of candidate pilot symbol positions for an uplink sTTI transmission in an uplink sub-frame includes: reading a pattern of pilot symbol positions pre-determined and agreed on with the base station, to serve as the pattern of candidate pilot symbol positions for the uplink sTTI transmission in the uplink sub-frame.

In some embodiments, determining a pattern of candidate pilot symbol positions for an uplink sTTI transmission in an uplink sub-frame includes: receiving a signaling from the base station, where the signaling includes a pattern of pilot symbol positions configured by the base station; and obtaining the pattern of pilot symbol positions configured by the base station from the signaling received, to serve as the pattern of candidate pilot symbol positions for the uplink sTTI transmission in the uplink sub-frame.

In some embodiments, the position indication information in the uplink grant includes at least one of: a pilot symbol position identifier in the uplink grant and a transmission format of the uplink grant.

In some embodiments, when the position indication information in the uplink grant includes the pilot symbol position identifier in the uplink grant, determining at least one pilot symbol position for an uplink sTTI based on the pattern of candidate pilot symbol positions and position indication information in the uplink grant includes: reading the pilot symbol position identifier, where the pilot symbol position identifier has a length of one bit; and based on the pilot symbol position identifier, in the pattern of candidate pilot positions, selecting an available pilot symbol position R, from SC-FDMA (Single-Carrier Frequency Division Multiple Access) symbol positions occupied by the uplink sTTI and positions before the SC-FDMA symbol positions occupied by the uplink sTTI, which is closest to the SC-FDMA symbol positions occupied by the uplink sTTI, to serve as the at least one pilot symbol position for the uplink sTTI, or, in the pattern of candidate pilot positions, selecting a pilot symbol position R', from the SC-FDMA symbol positions occupied by the uplink sTTI and the positions before the SC-FDMA symbol positions occupied by the uplink sTTI, which is closest to the available pilot symbol position R and different from the available pilot symbol position R, to serve as the at least one pilot symbol position for the uplink sTTI.

In some embodiments, the transmission format of the uplink grant includes: a DCI (Downlink Control Information) format of a single-user MIMO (Multiple-Input Multiple-Output) transmission or a DCI format of a multi-user MIMO transmission.

In some embodiments, when the position indication information in the uplink grant includes the transmission format of the uplink grant, determining at least one pilot symbol position for an uplink sTTI based on the pattern of candidate pilot symbol positions and position indication information in the uplink grant includes: in the pattern of candidate pilot positions, selecting two available pilot symbol positions, from the SC-FDMA symbol positions occupied by the uplink sTTI and positions before the SC-FDMA symbol positions occupied by the uplink sTTI, which are closest to the SC-FDMA symbol positions occupied by the uplink sTTI, to serve as the at least one pilot symbol position for the uplink sTTI.

Embodiments of the present disclosure further provides a method for determining pilot symbol position, including: determining a pattern of candidate pilot symbol positions for a UE (User Equipment) to implement an uplink sTTI (shortened Transmission Time Interval) transmission in an uplink sub-frame; and transmitting an uplink grant to the UE, where the uplink grant is used to schedule the UE to implement the uplink sTTI transmission, whereby the UE can determine at least one pilot symbol position for an uplink sTTI based on the pattern of candidate pilot symbol positions and position indication information in the uplink grant.

In some embodiments, determining a pattern of candidate pilot symbol positions for a UE to implement an uplink sTTI transmission in an uplink sub-frame includes: pre-determining a pattern of pilot symbol positions with the UE, to serve as the pattern of candidate pilot symbol positions for the UE to implement the uplink sTTI transmission in the uplink sub-frame.

In some embodiments, after determining a pattern of candidate pilot symbol positions for a UE to implement an uplink sTTI transmission, the method further includes: transmitting the pattern of candidate pilot symbol positions for the UE to implement the uplink sTTI transmission to the UE.

In some embodiments, transmitting the pattern of candidate pilot symbol positions for a UE to implement an uplink sTTI transmission to the UE includes: transmitting a signaling to the UE, where the signaling includes a pattern of candidate pilot symbol positions being pre-configured.

In some embodiments, the position indication information in the uplink grant includes at least one of: a pilot symbol position identifier in the uplink grant and a transmission format of the uplink grant.

In some embodiments, when the position indication information in the uplink grant includes the pilot symbol position identifier in the uplink grant, the pilot symbol position identifier in the uplink grant has a length of one bit.

In some embodiments, the transmission format of the uplink grant includes: a DCI (Downlink Control Information) format of a single-user MIMO (Multiple-Input Multiple-Output) transmission or a DCI format of a multi-user MIMO transmission.

Embodiments of the present disclosure further provides a UE (User Equipment), including: a first pattern determining circuitry configured to: determine a pattern of candidate pilot symbol positions for an uplink sTTI (shortened Transmission Time Interval) transmission in an uplink sub-frame; a receiving circuitry configured to: receive an uplink grant from a base station, wherein the uplink grant is used to schedule the uplink sTTI transmission; and a pilot symbol position determining circuitry configured to: determine at least one pilot symbol position for an uplink sTTI based on the pattern of candidate pilot symbol positions and position indication information in the uplink grant.

In some embodiments, the first pattern determining circuitry is configured to: read a pattern of pilot symbol positions pre-determined and agreed on with the base station, to serve as the pattern of candidate pilot symbol positions for the uplink sTTI transmission in the uplink sub-frame.

In some embodiments, the first pattern determining circuitry is configured to: receive a signaling from the base station, wherein the signaling includes a pattern of pilot symbol positions configured by the base station; and obtain the pattern of pilot symbol positions configured by the base station from the signaling received, to serve as the pattern of candidate pilot symbol positions for the uplink sTTI transmission in the uplink sub-frame.

In some embodiments, the position indication information in the uplink grant includes at least one of: a pilot symbol position identifier in the uplink grant and a transmission format of the uplink grant.

In some embodiments, the pilot symbol position determining circuitry is configured to: when the position indication information in the uplink grant includes the pilot symbol position identifier in the uplink grant, read the pilot symbol position identifier, wherein the pilot symbol position identifier has a length of one bit; and based on the pilot symbol position identifier, in the pattern of candidate pilot positions, select an available pilot symbol position R, from SC-FDMA (Single-Carrier Frequency Division Multiple Access) symbol positions occupied by the uplink sTTI and positions before the SC-FDMA symbol positions occupied by the uplink sTTI, which is closest to the SC-FDMA symbol positions occupied by the uplink sTTI, to serve as the at least one pilot symbol position for the uplink sTTI, or, in the pattern of candidate pilot positions, select a pilot symbol position R', from the SC-FDMA symbol positions occupied by the uplink sTTI and the positions before the SC-FDMA symbol positions occupied by the uplink sTTI, which is closest to the available pilot symbol position R and different from the available pilot symbol position R, to serve as the at least one pilot symbol position for the uplink sTTI.

In some embodiments, the transmission format of the uplink grant includes: a DCI (Downlink Control Information) format of a single-user MIMO (Multiple-Input Multiple-Output) transmission or a DCI format of a multi-user MIMO transmission.

In some embodiments, the pilot symbol position determining circuitry is configured to: when the position indication information in the uplink grant includes the transmission format of the uplink grant, in the pattern of candidate pilot positions, select two available pilot symbol positions, from the SC-FDMA symbol positions occupied by the uplink sTTI and positions before the SC-FDMA symbol positions occupied by the uplink sTTI, which are closest to the SC-FDMA symbol positions occupied by the uplink sTTI, to serve as the at least one pilot symbol position for the uplink sTTI.

Embodiments of the present disclosure further provides a base station, including: a second pattern determining circuitry configured to: determine a pattern of candidate pilot symbol positions for a UE (User Equipment) to implement an uplink sTTI (shortened Transmission Time Interval) transmission in an uplink sub-frame; and a transmitting circuitry configured to: transmit an uplink grant to the UE, wherein the uplink grant is used to schedule the UE to implement the uplink sTTI transmission, so that the UE can determine at least one pilot symbol position for an uplink sTTI based on the pattern of candidate pilot symbol positions and position indication information in the uplink grant.

In some embodiments, the second pattern determining circuitry is configured to: pre-determine a pattern of pilot symbol positions with the base station to serve as the pattern of candidate pilot symbol positions for the UE to implement the uplink sTTI transmission in an uplink sub-frame.

In some embodiments, the second pattern determining circuitry is configured to: transmit the pattern of candidate pilot symbol positions for the UE to implement the uplink sTTI transmission to the UE.

In some embodiments, the second pattern determining circuitry is configured to: transmit a signaling to the UE, wherein the signaling includes the pattern of candidate pilot symbol positions being pre-configured.

In some embodiments, the position indication information in the uplink grant includes at least one of: a pilot symbol position identifier in the uplink grant and a transmission format of the uplink grant.

In some embodiments, the position indication information in the uplink grant includes the pilot symbol position identifier in the uplink grant, and the pilot symbol position identifier in the uplink grant has a length of one bit.

In some embodiments, the transmission format of the uplink grant includes: a DCI (Downlink Control Information) format of a single-user MIMO (Multiple-Input Multiple-Output) transmission or a DCI format of a multi-user MIMO transmission.

In comparison with exiting technologies, the technical solution according to embodiment of the present disclosure possess following advantages.

In the present disclosure, firstly, it is possible to know which pilot symbol positions in the sub-frame are candidate pilot symbol positions based on a pattern of candidate pilot symbol positions being determined. Thereafter, in the pattern of candidate pilot symbol positions, at least one pilot symbol position for an UL sTTI can be determined based on position indication information of an uplink grant from the base station. That is to say, the base station only needs to indicate to the UE which pilot symbol positions can be used, and it is not necessary to indicate the relative distance between the pilot symbol and the UL sTTI to the UE. Accordingly, the bit overhead of DCI in the process of determining pilot symbol position is reduced.

Further, when the transmission format of the uplink grant is used to determine the pilot symbol position for the UL sTTI, two available pilot symbol positions, which are closest to the symbol position occupied by the UL sTTI, are directly selected. There is no need of indicating the relative distance between the two pilot symbol positions and the UL sTTI to the UE. Therefore, the bit overhead is further reduced.

DETAILED DESCRIPTION

Currently, an uplink pilot of LTE (Long Term Evolution) PUSCH (Physical Uplink Shared Channel) transmission is generated using a ZC (Zadoff-Chu) sequence, and a transmission bandwidth of the pilot is in accordance with that of the PUSCH. In an uplink sub-frame, the uplink pilots are respectively located at the fourth symbol position of each time slot, and multiple users are distinguished according to different cyclic shifts of the pilots. In order to support SU-MIMO (Single-User Multiple-Input Multiple-Output) transmission and MU-MIMO (Multi-User Multiple-Input Multiple-Output) transmission, two columns of pilots in one sub-frame are extended using OCC (Orthogonal Covering Code) to provide more pilot combinations.

For transmitting a pilot symbol of a sTTI (shortened Transmission Time Interval) having a length of two SC-FDMA (Single-Carrier Frequency Division Multiple Access) symbols, existing technologies propose a method for dynamically indicating pilot symbols. In the method for dynamically indicating pilot symbols, DCI (Downlink Control Information) granted by the uplink is transmitted to indicate whether a sTTI include an uplink pilot symbol or not; and if the sTTTI does not include an uplink pilot symbol, the DCI is further used to indicate a relative distance between a pilot symbol and the sTTI.

Accordingly, in the existing method for dynamically indicating pilot symbols, the relative distance between the pilot symbol and the sTTI is indicated in the DCI, thus a UE (User Equipment) determines a position of the pilot symbol by completely depending on the indication in the DCI. When the relative distance between the pilot symbol and the sTTI is large, the bit overhead of the DCI is large. Further, in the case of supporting both the SU-MIMO and the MU-MIMO, the UE needs to transmit two columns of pilot symbols, and the base station needs to indicate relative distances between the two columns of pilot symbols and the sTTI in the DCI, thus the bit overhead of the DCI is larger.

In the present disclosure, firstly, it is possible to know which pilot symbol positions in the sub-frame are candidate pilot symbol positions based on a pattern of candidate pilot symbol positions being determined. Thereafter, in the pattern of candidate pilot symbol positions, at least one pilot symbol position for an uplink sTTI can be determined based on position indication information of an uplink grant from the base station. That is to say, the base station only needs to indicate to the UE which pilot symbol position can be used, and it is not necessary to indicate the relative distance between the pilot symbol and the uplink sTTI to the UE. Accordingly, the bit overhead of DCI in a process of determining pilot symbol position is reduced.

In order to make above recited objectives, features and advantages of the present disclosure clear and easy to understand, embodiments of the present disclosure will be illustrated in detailed as follow in combination with corresponding drawings.

Figure 1:
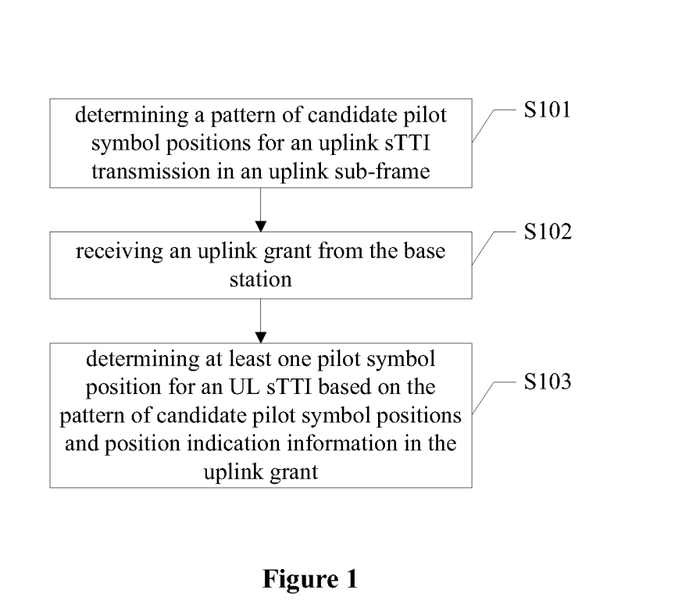
FIG. 1 schematically illustrates a flow chart of a method for determining pilot symbol position according to one embodiment of the present disclosure.

The present disclosure provides a method for determining pilot symbol position, as shown in FIG. 1, the method may include following steps from S101 to S103.

In step S101: determining a pattern of candidate pilot symbol positions for an uplink sTTI (shortened Transmission Time Interval) transmission in an uplink sub-frame.

In some embodiments, a UE (User Equipment) may be configured to determine the pattern of candidate pilot symbol positions for the uplink sTTI transmission in the uplink sub-frame.

The base station may pre-determine a pattern of pilot symbol positions for UL (Uplink) sTTI transmission with the UE through a protocol. That is to say, both the base station and the UE can learn about the pattern of pilot symbol positions for UL sTTI transmission in advance. The UE can read the pattern of pilot symbol positions pre-determined and agreed on with the base station, to serve as the pattern of candidate pilot symbol positions for the UL sTTI transmission.

It can be understood that, the base station and the UE may agree on a plurality of patterns of pilot symbol positions for UL sTTI transmission. The base station may transmit a RRC (Radio Resource Control) signaling, which includes an identifier of a pattern of pilot symbol positions should be selected by the UE, to the UE. After reception of the RRC signaling from the base station, the UE can select the pattern of pilot symbol positions indicated in the RRC signaling, from the preset plurality of patterns of pilot symbol positions, to serve as the pattern of candidate pilot symbol positions for UL sTTI transmission.

For example, the base station and the UE agree on three patterns of pilot symbol positions for UL sTTI transmission. In the RRC signaling, the base station informs the UE to select the pattern of pilot symbol positions which is identified as 2. After reception of the RRC signaling, the UE can select the pattern of pilot symbol positions which is identified as 2, to serve as the pattern of candidate pilot symbol positions for UL sTTI transmission.

In some embodiments, the base station may pre-configure a pattern of pilot symbol positions, and then transmit the pre-configured pattern of pilot symbol positions to the UE through a signaling. After reception of the signaling from the base station, the UE can obtain the pattern of pilot symbol positions pre-configured by the base station and take this pattern as the pattern of candidate pilot symbol positions for UL sTTI transmission.

In practical applications, the signaling configured by the base station may be a RRC signaling which includes the pre-configured pattern of pilot symbol positions. The signaling configured by the base station may be other signaling, which will not be described in detail herein.

In some embodiments, in the pattern of candidate pilot symbol positions, it is possible to indicate on which SC-FDMA symbol a pilot symbol will appear. When a pilot symbol appears on one SC-FDMA symbol, a pilot sequence may full fill a frequency resource of the SC-FDMA symbol. It can be understood that, when a pilot symbol appears on one SC-FDMA symbol, the pilot sequence may not full fill the frequency resource of the SC-FDMA symbol.

Figure 2:
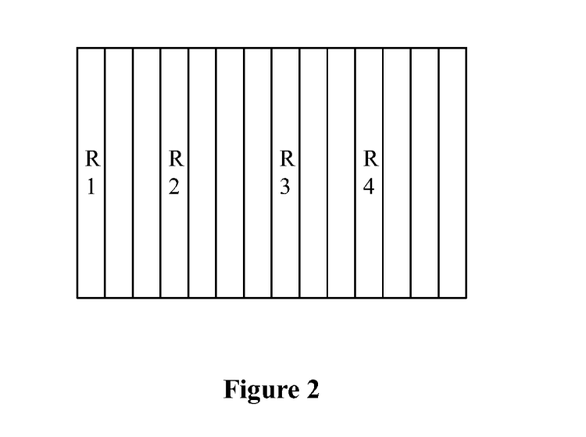
FIG. 2 schematically illustrates a pattern of candidate pilot symbol positions according to one embodiment of the present disclosure.
Figure 3:
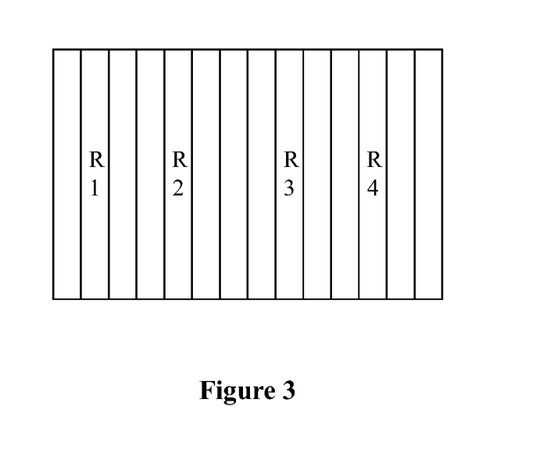
FIG. 3 schematically illustrates a pattern of candidate pilot symbol positions according to another embodiment of the present disclosure.

Referring to FIG. 2 and FIG. 3, patterns of candidate pilot symbol positions for UL sTTI transmission according to two embodiments of the present disclosure are respectively illustrated.

In FIG. 2, there are four pilot symbol positions in one sub-frame, which are respectively pilot symbol positions R1, R2, R3 and R4. Wherein, the pilot symbol position R1 is a first SC-FDMA symbol position of a first time slot in the sub-frame; the pilot symbol position R2 is a fourth SC-FDMA symbol position of the first time slot in the sub-frame; the pilot symbol position R3 is a first SC-FDMA symbol position of a second time slot in the sub-frame; and the pilot symbol position R4 is a fourth SC-FDMA symbol position of the second time slot in the sub-frame.

In other words, the pilot symbol positions include the first SC-FDMA symbol position and the fourth SC-FDMA symbol position of each time slot in the sub-frame.

The UE may take the pattern of pilot symbol positions shown in FIG. 2 as the pattern of candidate pilot symbol positions for UL sTTI transmission. In this case, the UE can learn that the first SC-FDMA symbol position and the fourth SC-FDMA symbol position of each time slot can serve as the pilot symbol positions.

In FIG. 3, the pilot symbol position R1 is the second SC-FDMA symbol position of the first time slot in the sub-frame; the pilot symbol position R2 is the fifth SC-FDMA symbol position of the first time slot in the sub-frame; the pilot symbol position R3 is the second SC-FDMA symbol position of the second time slot in the sub-frame; and the pilot symbol position R4 is the fifth SC-FDMA symbol position of the second time slot in the sub-frame.

In other words, the pilot symbol positions include the second SC-FDMA symbol position and the fifth SC-FDMA symbol position of each time slot in the sub-frame.

The UE may take the pattern of pilot symbol positions shown in FIG. 3 as the pattern of candidate pilot symbol positions for UL sTTI transmission. In this case, the UE can learn that the second SC-FDMA symbol position and the fifth SC-FDMA symbol position of each time slot can serve as the pilot symbol positions.

It can be understood that, in practical applications, the number of the pilot symbols in one sub-frame may be other numbers, that is to say, the number of the pilot symbol positions in one sub-frame may be other numbers, which are not limited to four as described in above recited embodiments.

Figure 4:
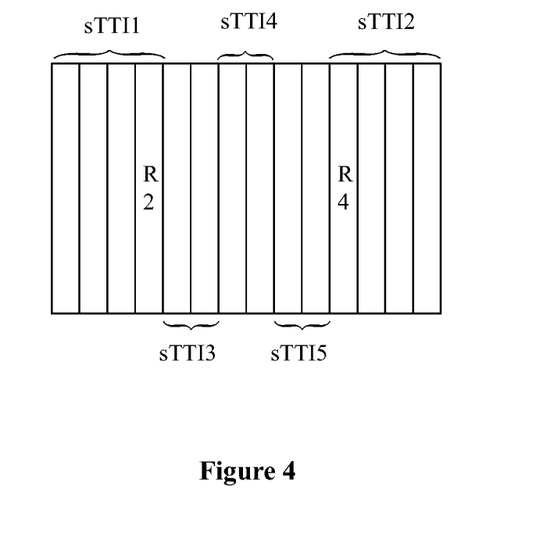
FIG. 4 schematically illustrates a relation between sTTIs and pilot symbol positions according to one embodiment of the present disclosure.

Referring to FIG. 4, a relation between sTTIs and pilot symbol positions according to one embodiment of the present disclosure is illustrated. In one sub-frame, there are two pilot symbols whose positions are respectively R2 and R4. The pilot symbol position R2 is the fourth SC-FDMA symbol position of the first time slot in the sub-frame; and the pilot symbol position R4 is the fourth SC-FDMA symbol position of the second time slot in the sub-frame.

Based on the pattern of candidate pilot symbol positions as shown in FIG. 4, the base station not only can schedule sTTIs, such as sTTI1 and sTTI2, which have a length of four SC-FDMA symbols, but also can schedule sTTIs, such as sTTI3, sTTI3 and sTTI5, which have a length of two SC-FDMA symbols. The sTTI1 can use the pilot symbol position R2 to transmit pilot symbol, and the sTTI3, sTTI4 and sTTI5 also can use the pilot symbol position R2 to transmit pilot symbol. In other words, the sTTI1, sTTI2, sTTI3, sTTI4 and sTTI5 can multiplex the pilot symbol position R2.

Figure 5:
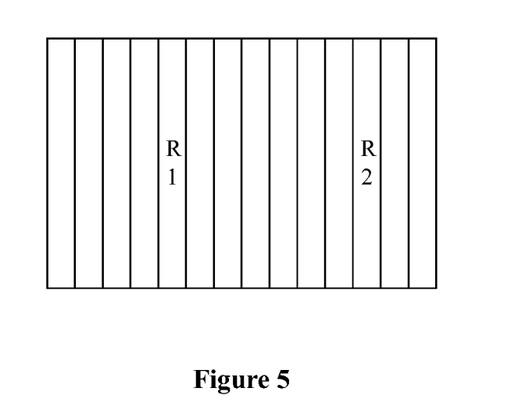
FIG. 5 schematically illustrates a pattern of pilot symbol positions according an existing technology.

Referring to FIG. 5, a pattern of pilot symbol positions for UL sTTI transmission according to an exiting technology is illustrated. The number of pilot symbols in one sub-frame is a fixed number, which is generally set to be two. Positions of the two pilot symbols are respectively R1 and R2. The pilot symbol position R1 is the fifth SC-FDMA symbol position of the first time slot in the sub-frame, and the pilot symbol position R2 is the fifth SC-FDMA symbol position of the second time slot in the sub-frame.

From FIGS. 2 to 5, it can be concluded that, in comparison with exiting technology, the pattern of candidate pilot symbol positions for UL sTTI transmission provided by the present disclosure is quite different. In the present disclosure, the pattern of candidate pilot symbol positions for UL sTTI transmission is not fixed and unchanged, but can be adjusted according to practical needs.

After the UE determines the pattern of candidate pilot symbol positions for UL sTTI, step S102 may be implemented.

In step S102: receiving an uplink grant from the base station.

In some embodiments, the uplink grant from the base station is used to schedule the UL sTTI, that is, the base station can set the sTTI, which needs to be scheduled, in the uplink grant. In practical applications, the base station may transmit the uplink grant to the UE through DCI (Downlink Control Information). After the UE receives the uplink grant from the base station, step S103 may be implemented.

In step S103: determining at least one pilot symbol position for an UL sTTI based on the pattern of candidate pilot symbol positions and position indication information in the uplink grant.

In some embodiments, the position indication information in the uplink grant may include a pilot symbol position identifier in the uplink grant, or a transmission format of the uplink grant, or both the pilot symbol position identifier in the uplink grant and the transmission format of the uplink grant.

In other words, the UE may determine the at least one pilot symbol position for an UL sTTI based on the pattern of the candidate symbol positions and the pilot symbol position identifier in the uplink grant. The UE may determine the at least one pilot symbol position for the UL sTTI based on the pattern of the candidate symbol positions and transmission format of the uplink grant. The UE may determine the at least one pilot symbol position for the UL sTTI based on the pattern of the candidate symbol positions, the pilot symbol position identifier in the uplink grant and the transmission format of the uplink grant.

It should be noted that, in embodiments of the present disclosure, in the uplink grant received by the UE from the base station through the DCI, the uplink sTTI which needs to be scheduled by the base station, is included. That is to say, the at least one pilot symbol position for the UL sTTI determined by the UE includes the pilot symbol position corresponding to the UL sTTI scheduled by the base station.

For example, referring to FIG. 4, in the uplink grant transmitted from the base station through the DCI, it indicates that the sTTIs for uplink transmission which need to be scheduled include sTTI1 to sTTI5. Then, the UE needs to determine pilot symbol positions corresponding to the five sTTIs which are respectively sTTI1 to sTTI5.

The way of determining the at least one pilot symbol position for an UL sTTI based on the pattern of candidate pilot symbol positions and pilot symbol position identifier in the uplink grant will be described in detail as following.

In some embodiments, the base station may set the pilot symbol position identifier in the uplink grant being transmitted to the UE through DCI (Downlink Control Information). When the base station sets the pilot symbol position identifier, for each sTTI, a corresponding pilot symbol position identifier is set. Through the pilot symbol position identifier, the UE can be informed about the pilot symbol position corresponding to the sTTI that needs to be determined. In some embodiments, each pilot symbol position identifier has a length of one bit.

After the UE receives the DCI, the pilot symbol position identifier can be obtained. After the UE obtains the pilot symbol position identifier, the pilot symbol position can be determined in the pattern of candidate pilot symbol positions.

Based on different values of the pilot symbol position identifier, in the pattern of candidate pilot symbol positions, the UE may select an available position R, from SC-FDMA (Single-Carrier Frequency Division Multiple Access) symbol positions occupied by the uplink sTTI and positions before the SC-FDMA symbol positions occupied by the uplink sTTI, which is closest to the SC-FDMA symbol positions occupied by the uplink sTTI, to serve as the at least one pilot symbol position for the uplink sTTI. Or, the UE may select a pilot symbol position R', from the SC-FDMA symbol positions occupied by the uplink sTTI and the positions before the SC-FDMA symbol positions occupied by the uplink sTTI, which is closest to the available pilot symbol position R, to serve as the at least one pilot symbol position for the uplink sTTI.

Since the pilot symbol position identifier has a length of one bit, a value of the pilot symbol position identifier may be one or zero. Therefore, when the value of the pilot symbol position identifier changes, the pilot symbol position determined by the UE may be different.

In some embodiments of the present disclosure, when the value of the pilot symbol position identifier is zero, the available position R, which is closest to the SC-FDMA symbol positions occupied by the uplink sTTI, is selected from the SC-FDMA symbol positions occupied by the uplink sTTI and positions before the SC-FDMA symbol positions occupied by the uplink sTTI, to serve as the at least one pilot symbol position for the uplink sTTI. When the value of the pilot symbol position identifier is one, a pilot symbol position R', which is closest to the available pilot symbol position R and different from the available pilot symbol position R, is selected from the SC-FDMA symbol positions occupied by the uplink sTTI and the positions before the SC-FDMA symbol positions occupied by the uplink sTTI, to serve as the at least one pilot symbol position for the uplink sTTI.

In some embodiments of the present disclosure, when the value of the pilot symbol position identifier is one, the available position R, which is closest to the SC-FDMA symbol positions occupied by the uplink sTTI, is selected from the SC-FDMA symbol positions occupied by the uplink sTTI and positions before the SC-FDMA symbol positions occupied by the uplink sTTI, to serve as the at least one pilot symbol position for the uplink sTTI. When the value of the pilot symbol position identifier is zero, the pilot symbol position R', which is closest to the available pilot symbol position R and different from the available pilot symbol position R, is selected from the SC-FDMA symbol positions occupied by the uplink sTTI and the positions before the SC-FDMA symbol positions occupied by the uplink sTTI, to serve as the at least one pilot symbol position for the uplink sTTI.

Accordingly, the pilot symbol position corresponding to the value of the pilot symbol position identifier may be selected according to requirements of practical application scenarios.

For example, in an application scenario when the UE moves in high speed, e.g., the user carries the UE when taking high-speed rail or other means of transport, in order to provide high quality service for the UE, a plurality columns of pilot symbols are transmitted in one column of sub-frames.

Figure 6:
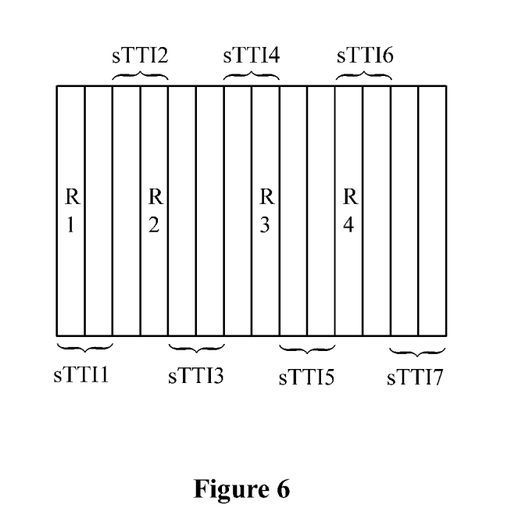
FIG. 6 schematically illustrates a relation between sTTIs and pilot symbol positions according to another embodiment of the present disclosure.

Referring to FIG. 6, a relation between sTTIs and pilot symbol positions according to one embodiment of the present disclosure is illustrated. The pilot symbol position R1 is the first SC-FDMA symbol position of the first time slot in the sub-frame; the pilot symbol position R2 is the fourth SC-FDMA symbol position of the first time slot in the sub-frame; the pilot symbol position R3 is the first SC- FDMA symbol position of the second time slot in the sub-frame; and the pilot symbol position R4 is the fourth SC-FDMA symbol position of the second time slot in the sub-frame.

There are seven UL sTTIs in the sub-frame, which are respectively sTTI1, sTTI2, sTTI3, sTTI4, sTTI5, sTTI6 and sTTI7. Each of the seven sTTIs has a length of two SC-FDMA symbols, wherein the sTTI1 corresponds to the first and the second SC-FDMA symbols of the first time slot in the sub-frame, the sTTI2 corresponds to the third and the fourth SC-FDMA symbols of the first time slot in the sub-frame, the sTTI3 corresponds to the fifth and the sixth SC-FDMA symbols of the first time slot in the sub-frame, the sTTI4 corresponds to the seventh SC-FDMA symbol of the first time slot in the sub-frame and the first SC-FDMA symbol of the second time slot in the sub-frame, the sTTI5 corresponds to the second and the third SC-FDMA symbols of the second time slot in the sub-frame, the sTTI6 corresponds to the fourth and the fifth SC-FDMA symbols of the second time slot in the sub-frame, and the sTTI7 corresponds to the sixth and the seventh SC-FDMA symbols of the second time slot in the sub-frame.

As shown in FIG. 6, the pilot symbol position is selected according to following rules: when the value of the pilot symbol position identifier is zero, the available position R, which is closest to the SC-FDMA symbol positions occupied by the uplink sTTI, is selected from the SC-FDMA symbol positions occupied by the uplink sTTI and positions before the SC-FDMA symbol positions occupied by the uplink sTTI, to serve as the at least one pilot symbol position for the uplink sTTI. When the value of the pilot symbol position identifier is one, a pilot symbol position R', which is closest to the available pilot symbol position R, is selected from the SC-FDMA symbol positions occupied by the uplink sTTI and the positions before the SC-FDMA symbol positions occupied by the uplink sTTI, to serve as the at least one pilot symbol position for the uplink sTTI.

When the value of the pilot symbol position identifier for the UL sTTI1 is zero, since the SC-FDMA symbol positions occupied by the sTTI1 include the pilot symbol position R1, the available position which is closest to the SC-FDMA symbol positions occupied by the UL sTTI1 is the pilot symbol position R1. Accordingly, the pilot symbol position determined for sTTI1 is R1.

When the value of the pilot symbol position identifier for the UL sTTI2 is zero, since the SC-FDMA symbol positions occupied by the sTTI2 include the pilot symbol position R2, the available position R, which is closest to the SC-FDMA symbol positions occupied by the UL sTTI2, is the pilot symbol position R2, thus the pilot symbol position determined for sTTI2 is R2. Therefore, the pilot symbol position determined for sTTI1 is R2. When the value of the pilot symbol position identifier for the UL sTTI2 is one, since the SC-FDMA symbol positions occupied by the sTTI2 include the pilot symbol position R2, the available position which is closest to the SC-FDMA symbol position occupied by the UL sTTI2 is the pilot symbol position R2. In the embodiment as shown in FIG. 6, the pilot symbol position R' which is closest to the available pilot symbol position R is the pilot symbol position R1. Thus, the pilot symbol position determined for sTTI2 is the pilot symbol position R1 which is closest to the pilot symbol position R2.

When the value of the pilot symbol position identifier for the UL sTTI3 is zero, since the SC-FDMA symbol positions occupied by sTTI3 does not include any one of the preset pilot symbol positions R1 to R4, the available pilot symbol position R, which is before the SC-FDMA symbol positions occupied by the sTTI3 and closest to sTTI3, that is, the pilot symbol position R2 is selected to serve as the pilot symbol position corresponding to sTTI3.

Correspondingly, when the value of the pilot symbol position identifier for the UL sTTI4 is zero, the pilot symbol position corresponding to sTTI4 is R3. When the value of the pilot symbol position identifier for the UL sTTI5 is zero, the pilot symbol position corresponding to sTTI5 is R3. When the value of the pilot symbol position identifier for the UL sTTI6 is zero, the pilot symbol position corresponding to sTTI6 is R4. When the value of the pilot symbol position identifier for the UL sTTI7 is zero, the pilot symbol position corresponding to sTTI7 is R4.

For the UE which is in a low speed application scenario, in order to reduce the overhead of pilot symbol, fewer columns of pilot symbols are transmitted in one column of sub-frames, and several sTTIs share a common column of pilot symbol positions.

Referring to FIG. 6, since the UE is in a low-speed status, it is possible to only use the pilot symbol position R1 and the pilot symbol position R3 to transmit pilot symbols. The pilot symbol position R2 and the pilot symbol position R4 will not be used to transmit pilot symbols, so as to reduce overhead of the pilot symbol.

In this case, the pilot symbol position identifier corresponding to sTTI1 is set to be zero, thus the pilot symbol position determined for sTTI1 is R1. Since the pilot symbol position R2 is not used to transmit pilot symbol, the pilot symbol position identifier corresponding to sTTI2 is set to be one, thus the pilot symbol position determined for sTTI2 is R1. The pilot symbol position identifier corresponding to sTTI3 is set to be one, thus the pilot symbol position determined for sTTI3 is R1.

The pilot symbol position identifier corresponding to sTTI4 is set to be zero, thus the pilot symbol position determined for sTTI4 is R3. Since the pilot symbol position R4 is not used to transmit pilot symbol, the pilot symbol position identifier corresponding to sTTI5 is set to be zero, thus the pilot symbol position determined for sTTI5 is R3. The pilot symbol position identifier corresponding to sTTI6 is set to be one, thus the pilot symbol position determined for sTTI6 is R3. The pilot symbol position identifier corresponding to sTTI7 is set to be one, thus the pilot symbol position determined for sTTI7 is R3.

It can be seen that, sTTI1, sTTI2 and sTTI3 share a common pilot symbol position R1; and sTTI4, sTTI5, sTTI6 and sTTI7 share a common pilot symbol position R3.

From above recited embodiments of the present disclosure, it can be seen that, by adding a pilot symbol position identifier having a length of one bit in DCI, the UE can learn about the pilot symbol position corresponding to the sTTI. When the pilot symbol position is far away from the sTTI, the corresponding pilot symbol position can be obtained by adding an additional pilot symbol position, which has a length of one bit, into the DCI.

However, in existing technologies, a distance between sTTI and the pilot symbol position needs to be added to the DCI, so as to indicate the pilot symbol position. When sTTI is far away from the pilot symbol position, for example, as shown in FIG. 5, the distance between sTTI and the pilot symbol position R1 is four, thus three bits need to be added to indicate the distance between sTTI and the pilot symbol position R1. Accordingly, the method for determining pilot symbol position provided by the present disclosure can reduce bit overhead of the DCI.

The way of determining pilot symbol position for UL sTTI transmission based on the pattern of candidate symbol positions and transmission format of the uplink grant will be described in detail as following.

In some embodiments, the transmission format of the uplink grant may include a DCI format of signal-user MIMO transmission, or include a DCI format of multi-user MIMO transmission.

In practical applications, in order to support the capacity of a larger uplink pilot, when the base station schedules the single-user MIMO transmission or the multi-user MIMO transmission of the UE in the DCI format transmitted to the UE, the UE can transmit two columns of pilot symbols in the data transmission of one sTTI.

When the transmission format of the uplink grant is the DCI format of the single-user MIMO transmission or the DCI format of the multi-user MIMO transmission, in the pattern of candidate pilot positions, the UE can select two available pilot symbol positions, from the SC-FDMA symbol positions occupied by the uplink sTTI and positions before the SC-FDMA symbol positions occupied by the uplink sTTI, which are closest to the SC-FDMA symbol positions occupied by the uplink sTTI, to serve as the at least one pilot symbol position for the uplink sTTI.

Figure 7:
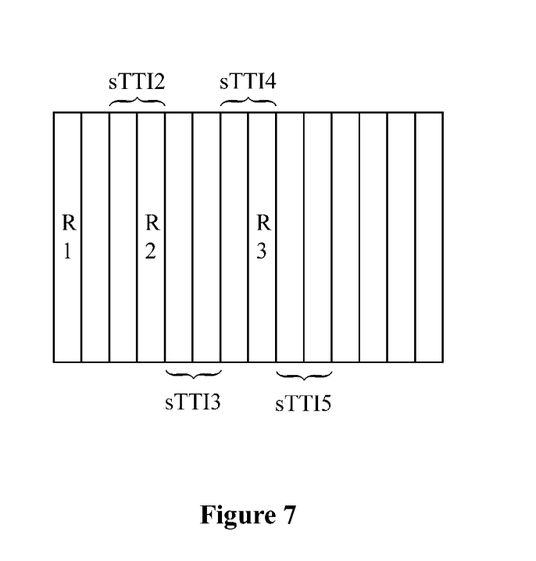
FIG. 7 schematically illustrates a relation between sTTIs and pilot symbol positions according to another embodiment of the present disclosure.

Referring to FIG. 7, a relation between sTTIs and pilot symbol positions according to another embodiment of the present disclosure is illustrated. The pilot symbol position R1 is the first SC-FDMA symbol position of the first time slot in the sub-frame, the pilot symbol position R2 is the fourth SC-FDMA symbol position of the first time slot in the sub-frame, and the pilot symbol position R3 is the first SC-FDMA symbol position of the second time slot in the sub-frame.

The SC-FDMA symbol positions occupied by sTTI2 include the pilot symbol position R2, and the SC-FDMA symbol positions occupied by sTTI4 include the pilot symbol position R3. Thus, when the transmission format of the uplink grant received by the UE is the DCI format of the single-user MIMO transmission or the DCI format of the multi-user MIMO transmission, for sTTI2, the pilot symbol position R2 is included, and there is a pilot symbol position R1 before the pilot symbol position R2. Therefore, the at least one pilot symbol positions determined for sTTI2 include the pilot symbol position R1 and the pilot symbol position R2. Correspondingly, the at least one pilot symbol positions determined for sTTI3 include the pilot symbol position R1 and the pilot symbol position R2.

Since sTTI4 includes the pilot symbol position R3 therein. Before the pilot symbol position R3, the pilot symbol position R2 is closest to the pilot symbol position R3. Therefore, the at least one pilot symbol positions determined for sTTI4 include the pilot symbol position R2 and the pilot symbol position R3. Correspondingly, the at least one pilot symbol positions determined for sTTI5 include the pilot symbol position R2 and the pilot symbol position R3.

In existing technologies, the base station needs to indicate in the DCI distances between the sTTI currently used and the two pilot symbol positions, respectively. For example, as shown in FIG. 7, sTTI currently used by the base station is sTTI3, thus the base station needs to indicate in the DCI a distance between sTTI3 and the pilot symbol position R1 and a distance between sTTI3 and the pilot symbol position R2, respectively, which cause large bit overhead.

However, in the present disclosure, the UE only needs to select two pilot symbol positions, which are respectively selected from the SC-FDMA symbol positions occupied by sTTI currently used by the base station, and positions before the SC-FDMA symbol positions occupied by the sTTI currently used and closest to the sTTI currently used, but does not need to know the distances between the sTTI currently used and the two pilot symbol positions. Therefore, the base station does not need to indicate in the DCI the distances between the sTTI currently used and the two pilot symbol positions, so that bit overhead of DCI is reduced.

Figure 8:
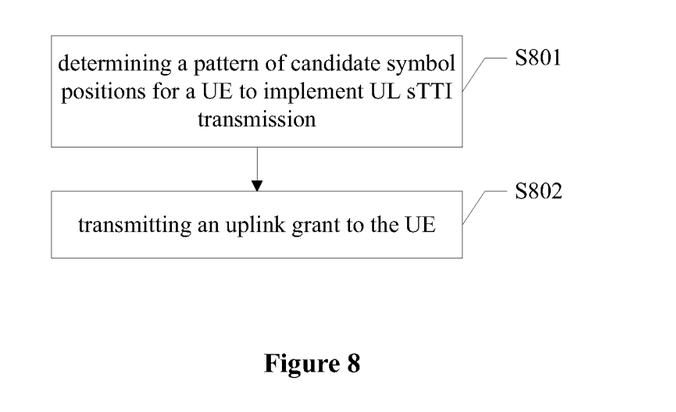
FIG. 8 schematically illustrates a flow chart of a method for determining pilot symbol position according to another embodiment of the present disclosure.

Referring to FIG. 8, a method for determining pilot symbol position according to another embodiment of the present disclosure is illustrated, which includes following steps from S801 to S802.

In step S801: determining a pattern of candidate symbol positions for a UE to implement UL sTTI transmission.

In some embodiments, the base station side may agree on with the UE in advance through a protocol to pre-determine the pattern of pilot symbol positions for UL sTTI transmission. That is to say, both the base station side and the UE may know the pattern of pilot symbol positions for UL sTTI transmission in advance. The UE may take the pattern of pilot symbol positions for UL sTTI transmission pre-determined and agreed on with the base station as the pattern of candidate pilot symbol positions for UL sTTI transmission.

It can be understood that, the base station and the UE may agree on a plurality of patterns of pilot symbol positions for UL sTTI transmission. The base station side may transmit a RRC (Radio Resource Control) signaling, which includes an identifier of a pattern of pilot symbol positions that the UE needs to select, to the UE. After reception of the RRC signal from the base station side, the UE can select, in the preset plurality of patterns of pilot symbol positions, the pattern of pilot symbol positions indicated in the RRC signal, to serve as the pattern of candidate pilot symbol positions for UL sTTI transmission.

In some embodiments, the base station may pre-configure the pattern of candidate pilot symbol positions, and then transmit the pre-configured pattern of candidate pilot symbol positions via a signaling to the UE. After reception of the signaling from the base station, the UE can obtain the pattern of candidate pilot symbol positions configured by the base station side and take this pattern as the pattern of candidate pilot symbol positions for UL sTTI transmission.

In step S802: transmitting an uplink grant to the UE.

In some embodiments, the uplink grant from the base station is used to schedule UL sTTI transmission, that is, the base station can set sTTI needs to be scheduled in the uplink grant. In practical applications, the base station may transmit the uplink grant to the UE via DCI.

In some embodiments, after the UE receives the uplink grant from the base station, a process of determining the pilot symbol position for UL sTTI can refer to steps S102 to S103, which will not be described herein.

Figure 9:
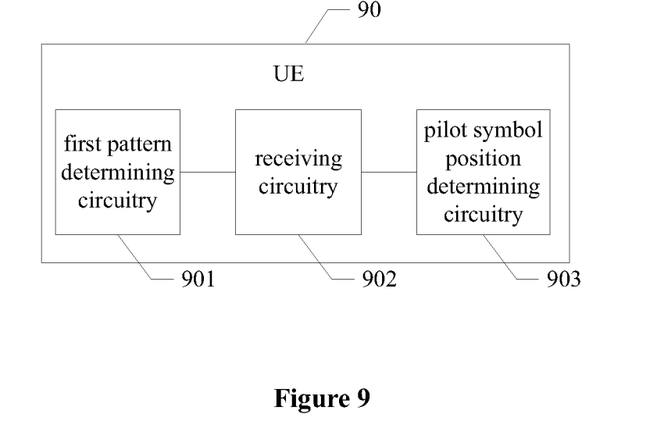
FIG. 9 schematically illustrates a structure of a user equipment according to one embodiment of the present disclosure.

Referring to FIG. 9, a UE (User Equipment) 90 according to one embodiment of the present disclosure is illustrated. The UE 90 includes: a first pattern determining circuitry 901, a receiving circuitry 902 and a pilot symbol position determining circuitry 903.

The first pattern determining circuitry 901 is configured to: determine a pattern of candidate pilot symbol positions for UL sTTI transmission in an uplink sub-frame.

The receiving circuitry 902 is configured to: receive an uplink grant from a base station, wherein the uplink grant is used to schedule the UL sTTI transmission.

The pilot symbol position determining circuitry 903 is configured to: determine at least one pilot symbol position for an UL sTTI based on the pattern of candidate symbol positions and position indication information in the uplink grant.

In some embodiments, the first pattern determining circuitry 901 is configured to: read a pattern of pilot symbol positions pre-determined and agreed on with the base station, wherein the pattern of pilot symbol positions is taken as the pattern of candidate pilot symbol position for UL sTTI transmission in the uplink sub-frame.

In some embodiments, the first pattern determining circuitry 901 is configured to: receive a signaling from the base station, wherein the signaling includes a pattern of pilot symbol positions configured by the base station; obtain the pattern of pilot symbol positions configured by the base station from the signaling received, wherein the pattern of pilot symbol positions obtained is taken as the pattern of candidate pilot symbol position for UL sTTI transmission in the uplink sub-frame.

In some embodiments, the position indication information in the uplink grant may include at least one of: a pilot symbol position identifier in the uplink grant and a transmission format of the uplink grant.

In some embodiments, the pilot symbol position determining circuitry 903 is configured to: when the position indication information in the uplink grant includes the pilot symbol position identifier in the uplink grant, read the pilot symbol position identifier, wherein the pilot symbol position identifier has a length of one bit; and based on the pilot symbol position identifier, in the pattern of candidate pilot positions, select an available pilot symbol position R, from SC-FDMA (Single-Carrier Frequency Division Multiple Access) symbol positions occupied by the uplink sTTI and positions before the SC-FDMA symbol positions occupied by the uplink sTTI, which is closest to the SC-FDMA symbol positions occupied by the uplink sTTI, to serve as the at least one pilot symbol position for the uplink sTTI, or, in the pattern of candidate pilot positions, select a pilot symbol position R', from the SC-FDMA symbol positions occupied by the uplink sTTI and the positions before the SC-FDMA symbol positions occupied by the uplink sTTI, which is closest to the available pilot symbol position R and different from the available pilot symbol position R, to serve as the at least one pilot symbol position for the uplink sTTI.

In some embodiments, the transmission format of the uplink grant may include any one of: a DCI format of a single-user MIMO transmission and a DCI format of a multi-user MIMO transmission.

In some embodiments, the pilot symbol position determining circuitry 903 may be configured to: when the position indication information in the uplink grant includes the transmission format of the uplink grant, in the pattern of candidate pilot positions, select two available pilot symbol positions, from the SC-FDMA symbol positions occupied by the uplink sTTI and positions before the SC-FDMA symbol positions occupied by the uplink sTTI, which are closest to the SC-FDMA symbol positions occupied by the uplink sTTI, to serve as the at least one pilot symbol position for the uplink sTTI.

Figure 10:
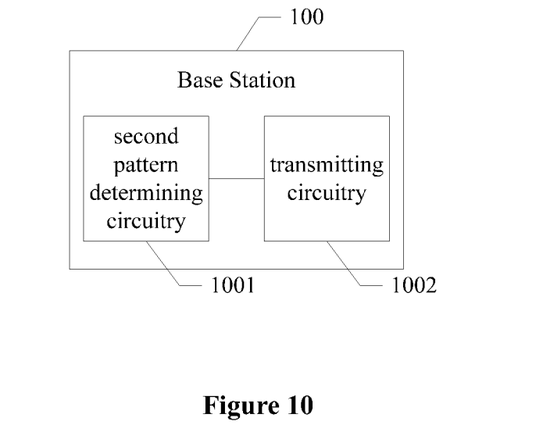
FIG. 10 schematically illustrates a structure of a base station according to one embodiment of the present disclosure.

Referring to FIG. 10, a base station 100 according to one embodiment of the present disclosure is illustrated, which includes a second pattern determining circuitry 1001 and a transmitting circuitry 1002.

The second pattern determining circuitry 1001 is configured to: determine a pattern of candidate pilot symbol positions for a UE to implement UL sTTI transmission.

The transmitting circuitry 1002 is configured to: transmit an uplink grant to the UE, so that the UE can determine a pilot symbol position for an UL sTTI based on position indication information in the uplink grant, wherein the uplink grant is used to schedule the UE to implement the UL sTTI transmission.

In some embodiments, the second pattern determining circuitry 1001 may be configured to: pre-determine a pattern of pilot symbol positions with the base station to serve as the pattern of candidate pilot symbol positions for the UE to implement the uplink sTTI transmission in an uplink sub-frame.

In some embodiments, the second pattern determining circuitry 1001 may be configured to: transmit the pattern of candidate pilot symbol positions for the UE to implement UL sTTI transmission to the UE.

In some embodiments, the second pattern determining circuitry 1001 may be configured to: transmit a signaling to the UE, wherein the signaling includes a pre-configured pattern of candidate pilot symbol positions.

In some embodiments, the position indication information in the uplink grant may include at least one of: a pilot symbol position identifier in the uplink grant and a transmission format of the uplink grant.

In some embodiments, the position indication information in the uplink grant may include the pilot symbol position identifier in the uplink grant which has a length of one bit.

In some embodiments, the transmission format of the uplink grant may include any one of: a DCI format of a single-user MIMO transmission and a DCI format of a multi-user MIMO transmission.

Those skilled in the art can understand that, all steps or some of the steps in various methods of above recited embodiments of the present disclosure can be accomplished by hardware under instruction of programs. The programs can be stored in a readable storage medium of a computer, wherein the storage medium may include: ROM (Read Only Memory), RAM (Random Access Memory), magnetic disk, light disk, etc.

Although the present disclosure has been disclosed above with reference to preferred embodiments thereof, it should be understood by those skilled in the art that various changes and modifications may be made without departing from the spirit or scope of the disclosure. Accordingly, the present disclosure covers changes and modifications made to the present disclosure that fall into scopes defined by the claims and equivalent technical solutions thereof.

The invention claimed is:

1. A method for determining pilot symbol position, comprising:
   determining a pattern of candidate pilot symbol positions for an uplink sTTI (shortened Transmission Time Interval) transmission in an uplink sub-frame;
   receiving an uplink grant from a base station, where the uplink grant is used to schedule the uplink sTTI transmission; and
   determining at least one pilot symbol position for an uplink sTTI based on the pattern of candidate pilot symbol positions and position indication information in the uplink grant,
   wherein the position indication information in the uplink grant comprises a pilot symbol position identifier in the uplink grant, and determining at least one pilot symbol position for an uplink sTTI based on the pattern of candidate pilot symbol positions and position indication information in the uplink grant comprises:
   reading the pilot symbol position identifier, where the pilot symbol position identifier has a length of one bit; and
   based on the pilot symbol position identifier, in the pattern of candidate pilot positions, selecting an available pilot symbol position R, from SC-FDMA (Single-Carrier Frequency Division Multiple Access) symbol positions occupied by the uplink sTTI and positions before the SC-FDMA symbol positions occupied by the uplink sTTI, which is closest to the SC-FDMA symbol positions occupied by the uplink sTTI, to serve as the at least one pilot symbol position for the uplink sTTI, or, in the pattern of candidate pilot positions, selecting a pilot symbol position R', from the SC-FDMA symbol positions occupied by the uplink sTTI and the positions before the SC-FDMA symbol positions occupied by the uplink sTTI, which is closest to the available pilot symbol position R and different from the available pilot symbol position R, to serve as the at least one pilot symbol position for the uplink sTTI.

2. The method for determining pilot symbol position according to claim 1, wherein determining a pattern of candidate pilot symbol positions for an uplink sTTI transmission in an uplink sub-frame comprises:

reading a pattern of pilot symbol positions pre-determined and agreed on with the base station, to serve as the pattern of candidate pilot symbol positions for the uplink sTTI transmission in the uplink sub-frame.

3. The method for determining pilot symbol position according to claim 1, wherein determining a pattern of candidate pilot symbol positions for an uplink sTTI transmission in an uplink sub-frame comprises:

receiving a signaling from the base station, where the signaling comprises a pattern of pilot symbol positions configured by the base station; and obtaining the pattern of pilot symbol positions configured by the base station from the signaling received, to serve as the pattern of candidate pilot symbol positions for the uplink sTTI transmission in the uplink sub-frame.

4. A method for determining pilot symbol position, comprising:

determining a pattern of candidate pilot symbol positions for an uplink sTTI (shortened Transmission Time Interval) transmission in an uplink sub-frame;

receiving an uplink grant from a base station, where the uplink grant is used to schedule the uplink sTTI transmission; and determining at least one pilot symbol position for an uplink sTTI based on the pattern of candidate pilot symbol positions and position indication information in the uplink grant, wherein the position indication information in the uplink grant comprises a transmission format of the uplink grant, the transmission format of the uplink grant comprises a DCI (Downlink Control Information) format of a single-user MIMO (Multiple-Input Multiple-Output) transmission or a DCI format of a multi-user MIMO transmission, and determining at least one pilot symbol position for an uplink sTTI based on the pattern of candidate pilot symbol positions and position indication information in the uplink grant comprises:

in the pattern of candidate pilot positions, selecting two available pilot symbol positions, from the SC-FDMA symbol positions occupied by the uplink sTTI and positions before the SC-FDMA symbol positions occupied by the uplink sTTI, which are closest to the SC-FDMA symbol positions occupied by the uplink sTTI, to serve as the at least one pilot symbol position for the uplink sTTI.

5. The method for determining pilot symbol position according to claim 4, wherein determining a pattern of candidate pilot symbol positions for an uplink sTTI transmission in an uplink sub-frame comprises:

reading a pattern of pilot symbol positions pre-determined and agreed on with the base station, to serve as the pattern of candidate pilot symbol positions for the uplink sTTI transmission in the uplink sub-frame.

6. The method for determining pilot symbol position according to claim 4, wherein determining a pattern of candidate pilot symbol positions for an uplink sTTI transmission in an uplink sub-frame comprises:

receiving a signaling from the base station, where the signaling comprises a pattern of pilot symbol positions configured by the base station; and obtaining the pattern of pilot symbol positions configured by the base station from the signaling received, to serve as the pattern of candidate pilot symbol positions for the uplink sTTI transmission in the uplink sub-frame.

7. A UE (User Equipment), comprising:

a first pattern determining circuitry configured to: determine a pattern of candidate pilot symbol positions for an uplink sTTI (shortened Transmission Time Interval) transmission in an uplink sub-frame;

a receiving circuitry configured to: receive an uplink grant from a base station, wherein the uplink grant is used to schedule the uplink sTTI transmission; and a pilot symbol position determining circuitry configured to: determine at least one pilot symbol position for an uplink sTTI based on the pattern of candidate pilot symbol positions and position indication information in the uplink grant, wherein the position indication information in the uplink grant comprises a pilot symbol position identifier in the uplink grant, and the pilot symbol position determining circuitry is configured to read the pilot symbol position identifier, wherein the pilot symbol position identifier has a length of one bit; and based on the pilot symbol position identifier, in the pattern of candidate pilot positions, select an available pilot symbol position R, from SC-FDMA (Single-Carrier Frequency Division Multiple Access) symbol positions occupied by the uplink sTTI and positions before the SC-FDMA symbol positions occupied by the uplink sTTI, which is closest to the SC-FDMA symbol positions occupied by the uplink sTTI, to serve as the at least one pilot symbol position for the uplink sTTI, or, in the pattern of candidate pilot positions, select a pilot symbol position R', from the SC-FDMA symbol positions occupied by the uplink sTTI and the positions before the SC-FDMA symbol positions occupied by the uplink sTTI, which is closest to the available pilot symbol position R and different from the available pilot symbol position R, to serve as the at least one pilot symbol position for the uplink sTTI.

8. The UE according to claim 7, wherein the first pattern determining circuitry is configured to: read a pattern of pilot symbol positions pre-determined and agreed on with the base station, to serve as the pattern of candidate pilot symbol positions for the uplink sTTI transmission in the uplink sub-frame.

9. The UE according to claim 7, wherein the first pattern determining circuitry is configured to: receive a signaling from the base station, wherein the signaling comprises a pattern of pilot symbol positions configured by the base station; and obtain the pattern of pilot symbol positions configured by the base station from the signaling received, to serve as the pattern of candidate pilot symbol positions for the uplink sTTI transmission in the uplink sub-frame.

10. A UE (User Equipment), comprising:
 a first pattern determining circuitry configured to: determine a pattern of candidate pilot symbol positions for an uplink sTTI (shortened Transmission Time Interval) transmission in an uplink sub-frame;
 a receiving circuitry configured to: receive an uplink grant from a base station, wherein the uplink grant is used to schedule the uplink sTTI transmission; and
 a pilot symbol position determining circuitry configured to: determine at least one pilot symbol position for an uplink sTTI based on the pattern of candidate pilot symbol positions and position indication information in the uplink grant,
 wherein the position indication information in the uplink grant comprises a transmission format of the uplink grant, the transmission format of the uplink grant comprises a DCI (Downlink Control Information) format of a single-user MIMO (Multiple-Input Multiple-Output) transmission or a DCI format of a multi-user MIMO transmission, and the pilot symbol position determining circuitry is configured to: in the pattern of candidate pilot positions, select two available pilot symbol positions, from the SC-FDMA symbol positions occupied by the uplink sTTI and positions before the SC-FDMA symbol positions occupied by the uplink sTTI, which are closest to the SC-FDMA symbol positions occupied by the uplink sTTI, to serve as the at least one pilot symbol position for the uplink sTTI.

11. The UE according to claim 10, wherein the first pattern determining circuitry is configured to: read a pattern of pilot symbol positions pre-determined and agreed on with the base station, to serve as the pattern of candidate pilot symbol positions for the uplink sTTI transmission in the uplink sub-frame.

12. The UE according to claim 10, wherein the first pattern determining circuitry is configured to: receive a signaling from the base station, wherein the signaling comprises a pattern of pilot symbol positions configured by the base station; and obtain the pattern of pilot symbol positions configured by the base station from the signaling received, to serve as the pattern of candidate pilot symbol positions for the uplink sTTI transmission in the uplink sub-frame.

\* \* \* \* \*